(12) United States Patent
Summers

(10) Patent No.: US 6,896,020 B1
(45) Date of Patent: May 24, 2005

(54) TIRE INFLATED WITH A PLURALITY OF BALLS

(75) Inventor: Wade Summers, Louisville, KY (US)

(73) Assignee: TBDC, LLC, Crestwood, KY (US)

( * ) Notice: Subject to any disclaimer, the term of this patent is extended or adjusted under 35 U.S.C. 154(b) by 118 days.

(21) Appl. No.: 09/879,709

(22) Filed: Jun. 12, 2001

Related U.S. Application Data (60) Provisional application No. 60/215,256, filed on Jun. 30, 2000.

(51) Int. Cl.[7] .............. B60C 5/00; B60C 5/20; B60C 19/12
(52) U.S. Cl. ............... 152/334.1; 152/317; 152/336.1
(58) Field of Search .......................... 152/333.1, 336.1, 152/339.1, 340.1, 341.1, 310, 317, 334.1, 152/337.1, 338.1

(56) References Cited

U.S. PATENT DOCUMENTS

| | | | |
|---|---|---|---|
| 442,393 A | 12/1890 | Richwine | |
| 459,614 A | 9/1891 | Richwine | |
| 475,785 A | 5/1892 | Mason | |
| 487,419 A | 12/1892 | Lee | |
| 492,280 A | 2/1893 | Fisher | |
| 575,797 A * | 1/1897 | Welch | 152/336.1 |
| 584,498 A | 6/1897 | Ettinger | |
| 601,055 A | 3/1898 | Greaves | |
| 627,616 A * | 6/1899 | Hill | 152/309 |
| 856,411 A * | 6/1907 | Mains | 152/334.1 |
| 857,281 A | 6/1907 | Hogben | |
| 912,917 A | 2/1909 | Summers | |
| 952,675 A | 3/1910 | Krum | |
| 963,320 A | 7/1910 | Peck | |
| 967,506 A * | 8/1910 | Evans | 152/331.1 |
| 1,000,165 A | 8/1911 | Fischer | |
| 1,185,660 A * | 6/1916 | Harris | 152/337.1 |
| 1,243,513 A | 10/1917 | Grubb | |
| 1,332,953 A * | 3/1920 | Richards | 152/336.1 |
| 1,373,111 A | 3/1921 | Young | |
| 1,424,360 A * | 8/1922 | Jacobs | 152/334.1 |
| 1,654,567 A * | 1/1928 | Wolfrom | 152/53 |
| 2,070,066 A | 2/1937 | Picardi | |
| 2,143,471 A * | 1/1939 | Booharin | 152/336.1 |
| 3,127,920 A | 4/1964 | Hercules | |
| 3,208,497 A | 9/1965 | Schutt | |
| 3,381,735 A | 5/1968 | Talcott et al. | |
| 3,981,342 A | 9/1976 | Farber et al. | |
| 3,993,114 A | 11/1976 | Hinderks | |
| 4,008,743 A | 2/1977 | Welch | |
| 4,013,111 A | 3/1977 | Powell | |
| 4,037,635 A | 7/1977 | Ippen et al. | |

(Continued)

FOREIGN PATENT DOCUMENTS

JP 07-228111 * 2/1994

(Continued)

OTHER PUBLICATIONS

Henri Ulrich, "Polyurethane," Modern Plastics Encyclopedia, Oct. 1977, vol. 54, No. 10A, p. 95-97.*

(Continued)

*Primary Examiner*—Blaine Copenheaver
*Assistant Examiner*—Justin Fischer
(74) *Attorney, Agent, or Firm*—Camoriano and Associates; Theresa Fritz Camoriano (57) ABSTRACT

A tire assembly includes a safety rim, defining recesses on its inner surface, a tire including left and right edges, which are received in said recesses, and a plurality of inflated balls lying between the tire and the rim.

6 Claims, 12 Drawing Sheets

U.S. PATENT DOCUMENTS

| | | | |
|---|---|---|---|
| 4,037,636 | A | 7/1977 | Hagenbohmer et al. |
| 4,051,883 | A | 10/1977 | Ippen et al. |
| 4,057,090 | A | 11/1977 | Hoshikawa et al. |
| 4,064,922 | A | 12/1977 | Farber et al. |
| 4,090,546 | A | 5/1978 | Honda et al. |
| 4,094,353 | A | 6/1978 | Ford |
| 4,109,695 | A | 8/1978 | Miyazato |
| 4,113,799 | A | 9/1978 | Van Ornum et al. |
| 4,116,895 | A | 9/1978 | Kageyama et al. |
| 4,120,337 | A | 10/1978 | Soma et al. |
| 4,130,144 | A | 12/1978 | Harris |
| 4,149,579 | A | 4/1979 | Senger |
| 4,161,202 | A | 7/1979 | Powell et al. |
| 4,164,250 | A | 8/1979 | Shichman |
| 4,177,849 | A | 12/1979 | Osada et al. |
| 4,183,390 | A | 1/1980 | Hallman |
| 4,186,042 | A | 1/1980 | Powell et al. |
| 4,197,893 | A | 4/1980 | O'Coin |
| 4,213,491 | A | 7/1980 | Pope et al. |
| 4,214,619 | A | 7/1980 | Bowerman, Jr. et al. |
| 4,216,812 | A | 8/1980 | Bourne |
| 4,228,839 | A | 10/1980 | Bohm et al. |
| 4,231,407 | A | 11/1980 | James |
| 4,237,952 | A | 12/1980 | Chautard et al. |
| 4,239,076 | A | 12/1980 | Chautard et al. |
| 4,254,810 | A | 3/1981 | Shichman |
| 4,257,467 | A | 3/1981 | Van der Burg |
| 4,262,624 | A | 4/1981 | Soeda et al. |
| 4,287,928 | A | 9/1981 | Hallman |
| 4,294,730 | A | 10/1981 | Kenney |
| 4,318,435 | A | 3/1982 | Heath-Coleman |
| 4,356,214 | A | 10/1982 | Soeda et al. |
| 4,371,023 | A | 2/1983 | Campagna |
| 4,493,355 | A | 1/1985 | Ippen et al. |
| 4,665,963 | A | 5/1987 | Timar et al. |
| 4,884,609 | A | 12/1989 | Ho |
| 4,945,965 | A | 8/1990 | Kim |
| 5,031,679 | A | 7/1991 | Shoner |
| 5,073,444 | A | 12/1991 | Shanelee |
| 5,180,455 | A | 1/1993 | Cheng |
| 5,244,026 | A | 9/1993 | Yasushi |
| 5,301,729 | A | 4/1994 | Blair |
| 5,361,817 | A | 11/1994 | Chen |
| 5,385,191 | A | 1/1995 | Aflague et al. |
| 5,679,184 | A | 10/1997 | Hosking |
| 5,685,925 | A | 11/1997 | Riquier et al. |
| 5,693,161 | A | 12/1997 | Ho |
| 5,795,414 | A | 8/1998 | Shih |
| 5,874,138 | A | 2/1999 | Fitzpatrick |
| 6,213,179 | B1 | 4/2001 | Igarashi |
| 6,269,857 | B1 | 8/2001 | Kanai et al. |
| 6,401,773 | B1 | 6/2002 | Cho |
| 6,401,774 | B1 | 6/2002 | Rooney |
| 6,500,286 | B1 | 12/2002 | Ishikawa et al. |
| 6,539,994 | B1 | 4/2003 | Ruffa |

FOREIGN PATENT DOCUMENTS

NL 1001652 * 11/1995

OTHER PUBLICATIONS

Translation of NL 1001652, "Structure for a rim and a covering installed around the rim", United States Patent & Trademark Office, Aug. 2004.*

* cited by examiner

TIRE INFLATED WITH A PLURALITY OF BALLS

This application claims priority from U.S. Provisional Application Ser. No. 60/215,256, filed Jun. 30, 2000.

BACKGROUND OF THE INVENTION

The present invention relates to tires, and, in particular, to a pneumatic tire which is mounted on a safety rim and which is inflated by a plurality of individual balls.

For off-road vehicles, it is desirable to have low tire pressure in order to have better traction and higher speeds. However, if the tire pressure is reduced enough to obtain the desired traction, there is a severe risk of rim and tube damage when the tire hits a bump or other irregularity. Failure of the rim or a flat tire will prevent the competitor from finishing the event. Flat tires are a common cause of poor competitive performance by an otherwise capable competitor. In recent years, the more financially able competitors have adopted the use of foam tire inserts to replace conventional "inner" tubes. While these inserts solve the problem of flat tire failure, they can decompose and cause underinflated tires. They also create poorer traction due to the apparent high inflation pressure when compared to conventional inner tube/tire combinations at the normal inflation pressures. They are also expensive and have a very limited useful life. Therefore, while foam tire inserts perform a useful function, they do not fully solve the problems encountered in the art.

Individual balls have been used to support a tire in the past. Our research found patents between the years 1890 and 1921 that taught the use of individual balls to support a tire. For example, U.S. Pat. No. 442,393 "Richwine" shows a tire A, which surrounds balls E and which is laced onto studs C on the rim. Most of those prior art balls were solid or thick-walled, relying on the stiffness of the material of the ball to provide support to the tire. Later, around 1920, tires were developed using inner tubes, and the use of internal balls inside a tire was abandoned. These newer types of tires generally required the tire to be installed onto a two-piece rim in a deflated state. Once the tire was installed on the rim, it was inflated. While this type of tire provided a softer, more comfortable ride than was possible with the earlier tires, the two-piece rim was dangerous, and people occasionally were injured when the rim came apart under pressure. Around the early 1940s, the safety rim came into use. This was a one-piece rim with internal recesses that received the edges of the tire. The edges of the tire seated against the rim along those internal recesses. The use of these safety rims is now the norm, with the tire being installed onto the safety rim and then inflated, either with or without the use of an inner tube.

SUMMARY OF THE INVENTION

The present invention re-introduces the long-abandoned use of balls, but puts the balls into a modern tire assembly using a safety rim. In addition, the balls that are used in the preferred embodiments of the present invention have characteristics that are different from the balls that were used in the very early tires, as they do not rely on thick, heavy walls to support the load but rather rely upon the internal pressure in a relatively thin-walled ball. In the present invention, balls are put inside a standard modern tire, and the tire is then mounted onto a standard safety rim. This is contrary to the teachings of the art, in which the standard tire is mounted onto the standard safety rim in a deflated state, and, only after being mounted onto the rim, is the tire inflated. However, this new combination achieves benefits that were not available either to the early 20th century ball-type tires, or to the late 20th century pneumatic tires mounted on a safety rim.

By mounting the tire on a safety rim, with inflated balls inside, the present invention obtains all the benefits of modern tires, plus many additional benefits. First, the balls within the tire of the present invention can be inflated to a lower pressure than a regular tire, so as to obtain improved traction, without risking damage to the tire or rim. Second, the design of the present invention greatly reduces the probability of a flat tire.

The reason the balls can be inflated to a lower pressure without increasing the risk of damage to the tire and rim is that this arrangement acts like a built-in progressive suspension. The harder the tire hits a surface, the greater the internal pressure in the balls adjacent to the area in contact with the ground. When a portion of the tire hits a surface, the force tends to deform the ball supporting that portion of the tire, which increases the internal pressure in that particular ball. Thus, that particular ball is suddenly resisting additional distortion with a higher internal pressure, thereby protecting the tire and rim from damage. This differs from a normal tire, in which the internal pressure does not increase substantially, because the air simply shifts within the large internal volume of the tire. For example, for a motorcycle tire assembly made in accordance with the present invention, the balls may be run at 3–5 pounds of pressure, as opposed to typical inner tube tires that are run at 12–18 pounds of pressure, without increasing the risk of damage to the tire and rim. The balls also can be used in a wide temperature range and are very durable.

The design of the present invention also protects against flat tires, because, if an individual ball is punctured and deflated, or even if several of the balls are punctured and deflated, the tire is still inflated sufficiently to continue to function. This is true even under extreme temperature conditions, where inserts fail. A punctured ball can then simply be replaced without having to replace the remaining balls.

A rim lock may be used to help hold the tire bead onto the rim and to help prevent shifting of the balls during operation of the tire.

DESCRIPTION OF THE PREFERRED EMBODIMENTS

FIGS. 1–4 and 6–15 show a first tire assembly 10, made in accordance with the present invention. The tire assembly 10 includes a tire 12, which is mounted on a rim 14, which, in turn, is mounted on a hub 16. In this preferred embodiment, the tire 12 is a standard tire, and the rim 14 is a standard safety rim. The safety rim 14 includes a one-piece ring having a generally U-shaped cross-section and defining left and right recesses 32 which receive the beads or cords 36 of the tire edges.

Figure 4:
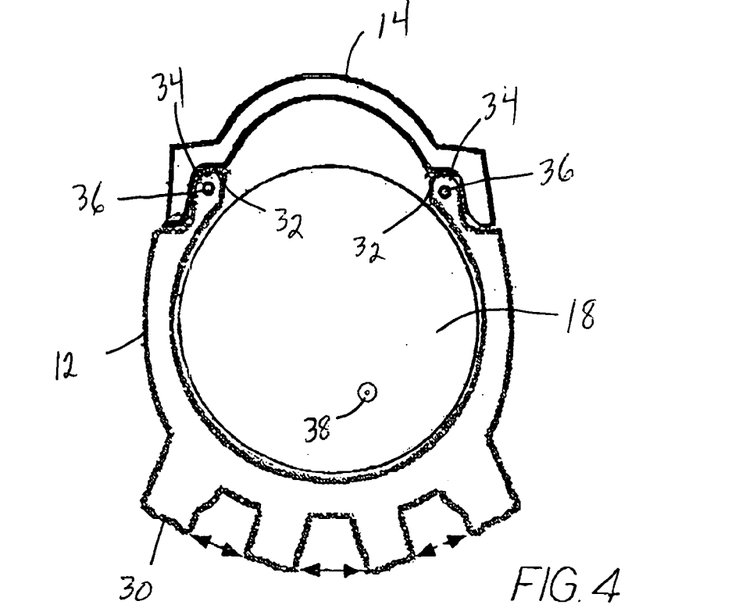
FIG. 4 is a view taken along the line 4—4 of FIG. 3.

Between the rim 14 and the tire 12 are individual balls 18. The balls have a diameter and extend radially to span the space from the tire edges to the tread area of the tire, so that a single layer of balls substantially fills the empty space between the rim 14 and the tire 12. The number, size, and shape of the balls 18 are selected depending upon the dimensions of the tire 12 and rim 14. While this view shows the ball 18 as having a substantially spherical shape, that is due to the fact that this particular tire casing 12 and rim 14 together form a void space with a substantially circular cross-section. If the rim 14 were substantially wider than the height of the tire casing, or if the height of the tire casing were substantially taller than the width of the rim, then the balls 18 preferably would have a more elliptical shape. Also, a more elliptical shape may be desirable in order to fit the desired number of balls into the tire, as will be explained later. The balls 18 preferably are made of a material that does not stretch significantly, so the surface area of the ball does not increase appreciably as the internal pressure of the gas inside the ball increases.

In the case of balls to be used in off-road motorcycles, the ball should be able to withstand five times the weight of the motorcycle and rider without exceeding its elastic limit, without exceeding its tensile limit, and without stretching more than 50% from its initial surface area. Since it is desirable to make the balls lightweight, it is also desirable to make the wall of the ball as thin as possible while still meeting the other design criteria.

Figure 12:
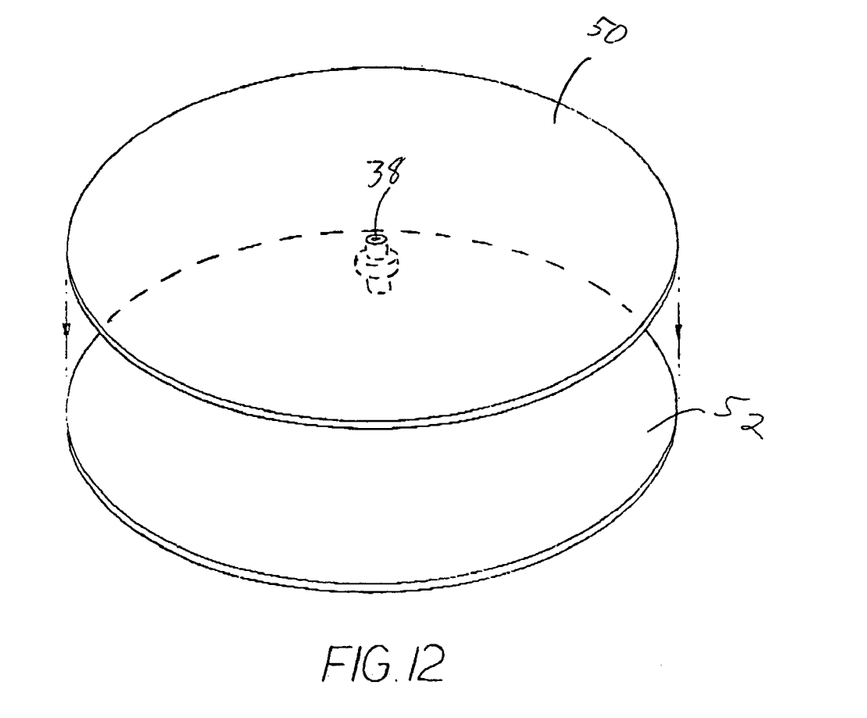
FIG. 12 is a view of two pieces of film being assembled together to make the ball of FIG. 4.
Figure 13:
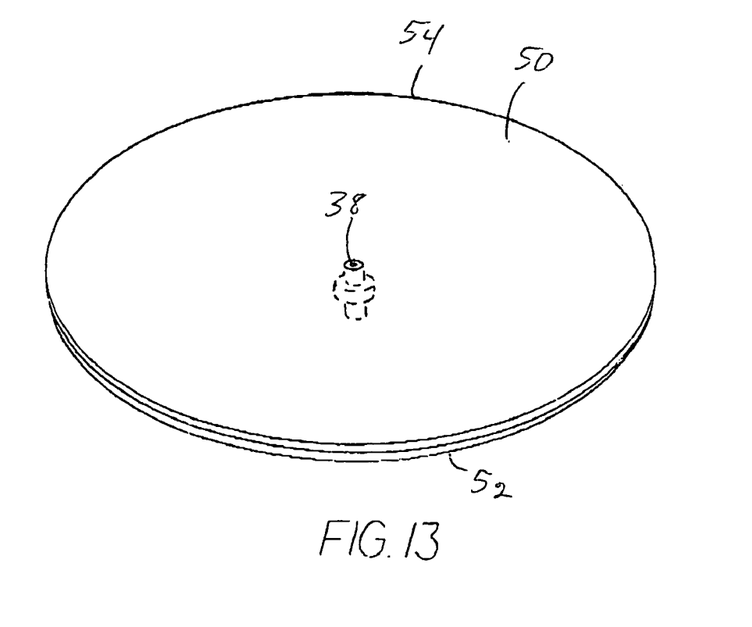
FIG. 13 is a view of the two pieces of film of FIG. 12 lying adjacent to each other before they are welded together.
Figure 14:
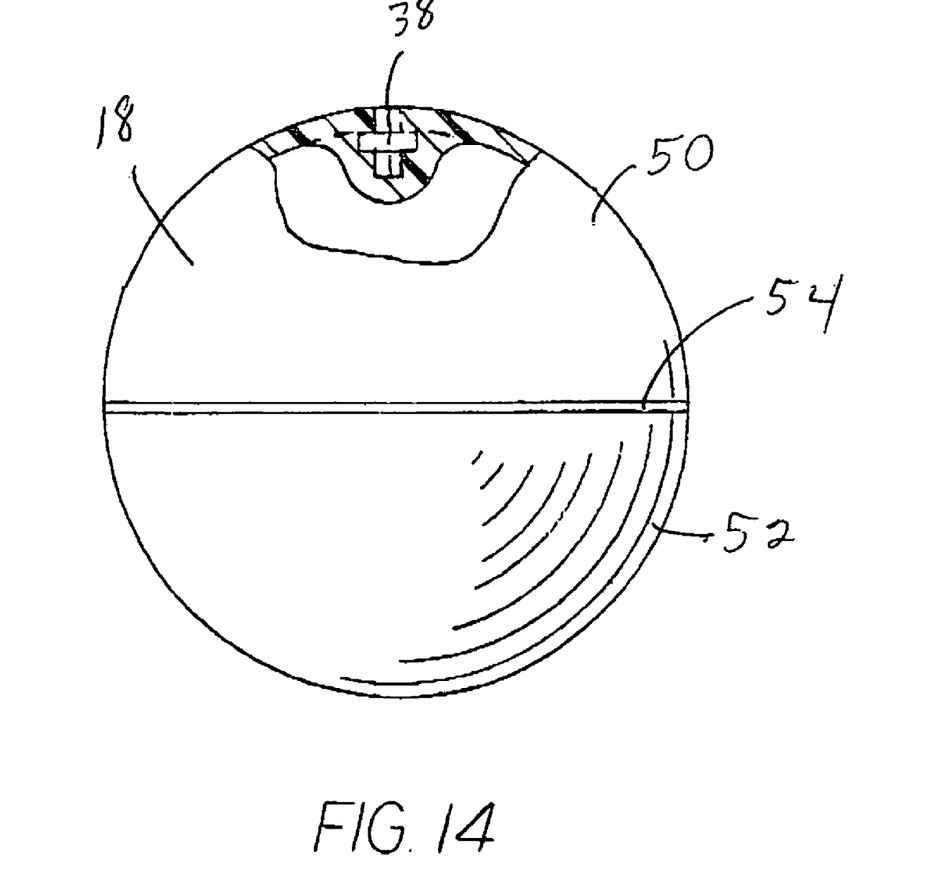
FIG. 14 shows the ball of FIGS. 12 and 13 after it has been welded and inflated.

The balls that have been successfully tested for off-road motorcycle use are made of polyether-based polyurethane sheet that is 0.050 inches thick (50 mils), welded together as shown in FIGS. 12–14. The diameter of these balls is from 2.5 to 4.5 inches, and they support 3000 pounds of force without exceeding their elastic or tensile limits and without stretching over 50% more than their initial surface area before they were placed under any load. One advantage of this material is that it is recyclable and can be remolded.

It is estimated that balls for automobile tires would be from four to eight inches in diameter and 30–100 mils thick, while able to support 25,000 pounds without exceeding elastic and tensile limits and without stretching beyond 150% of their initial surface area before loading.

In order to define the balls in more general terms, it is preferred that the balls be able to support a force in pounds that is at least one hundred times the cube of their diameter in inches without exceeding their tensile and elastic limits and without stretching beyond 150% of their initial surface area. Also, it is preferred that the wall thickness be less than 3% of the diameter, and more preferably less than 2% of the diameter. So, for example, for a ball that is three inches in diameter, it preferably should be able to support at least 2700 pounds (3×3×3×100) without exceeding its tensile and elastic limits and without stretching to more than 150% of its initial surface area. It preferably should also have a wall thickness less than 0.09 inches (3% of 3), and more preferably less than 0.06 inches (2% of 3). For a ball that is five inches in diameter, it preferably should be able to support at least 12,500 pounds (5×5×5×100) without exceeding its tensile and elastic limits and without stretching to more than 150% of its initial surface area. It preferably should also have a wall thickness less than 0.15 inches (3% of 5) and more preferably less than 0.10 inches (2% of 5).

While rotational molding and welding of sheets have already been disclosed, it is also possible to make the balls by injection molding. Also, reinforcing materials, such as fibers could be incorporated. Further research will no doubt disclose even better materials and fabrication technologies, which will also be within the scope of the present invention.

Figure 3:
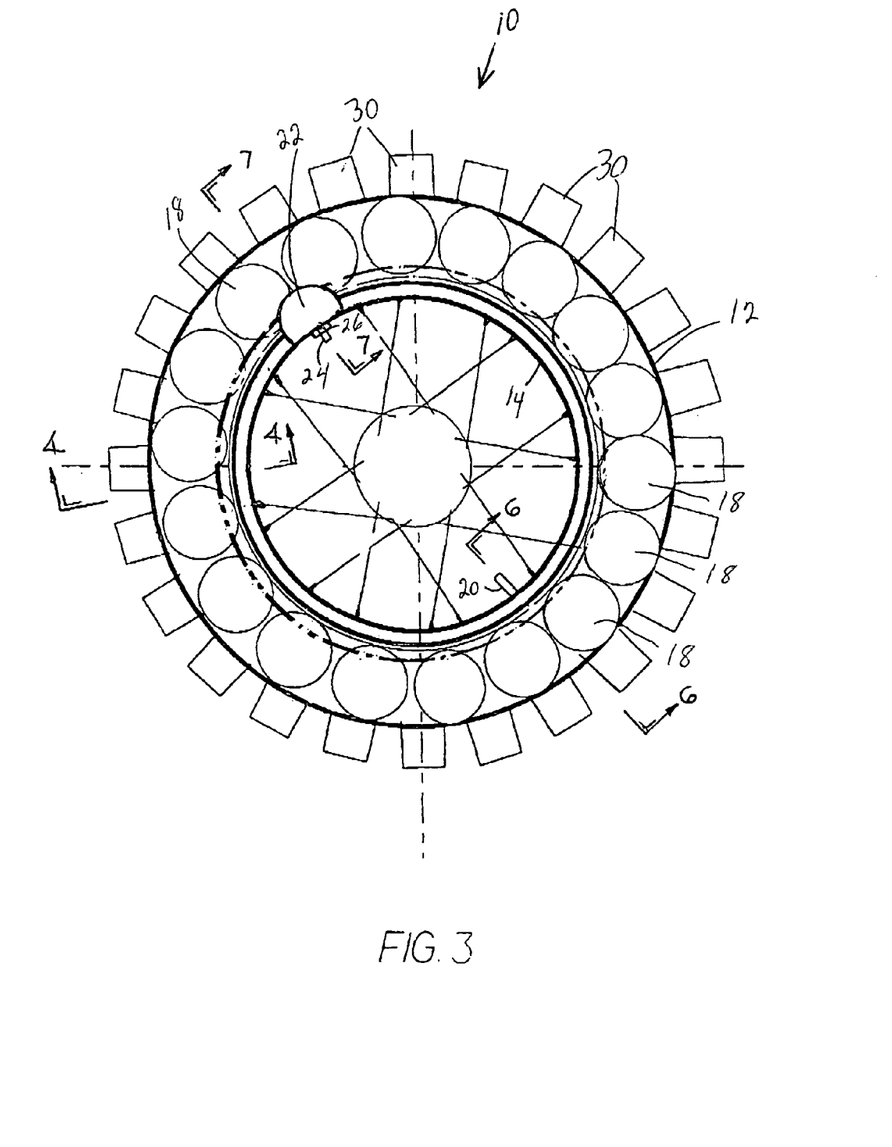
FIG. 3 is a schematic side sectional view of the rear tire of FIG. 1.

As shown in FIG. 3, there is a valve 20, which permits the insertion of gas under pressure into the space between the rim 14 and the tire 12. There is also a standard rim lock 22, which is secured to the inside of the rim 14 by means of a bolt 24 and nut 26. The rim lock 22 is shown in more detail in FIG. 7, mounted on a slightly modified rim 14A, and will be described later. The tire 12 includes a tread, which defines knobs 30.

FIG. 4 shows a section through the assembly 10 of FIG. 3. The rim 14 has a substantially inverted U-shaped cross-section and defines left and right recesses 32. The left and right edges 34 of the standard tire 12 have embedded cords 36, and these edges 34 with embedded cords 36 are received in the recesses 32 and seal against the internal surface of the recesses 32 in the rim 14. This figure also shows that the ball 18 has its own individual valve 38, which permits the ball 18 to be inflated to a desired pressure so that the gas pressure inside the ball is greater than the ambient gas pressure acting on the outside of the ball in order to maintain the ball in an inflated state. A thin-walled ball such as this ball 18 relies on this difference between the internal gas pressure and the ambient gas pressure in order to maintain a rounded, inflated shape and would collapse if the internal and external pressures were the same while a thick-walled ball relies on the stiffness of the material of the ball to provide support to the ball.

Figure 6:
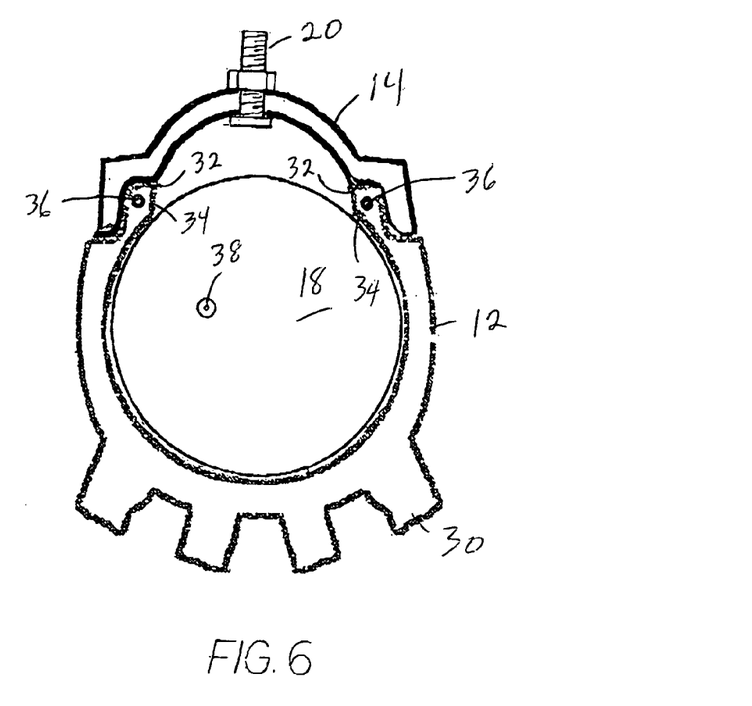
FIG. 6 is a view taken along the line 6—6 of FIG. 3.

FIG. 6 shows the standard tire valve 20, which extends through the rim 14 and permits pressurized gas to be inserted between the tire 12 and the rim 14.

Figure 7:
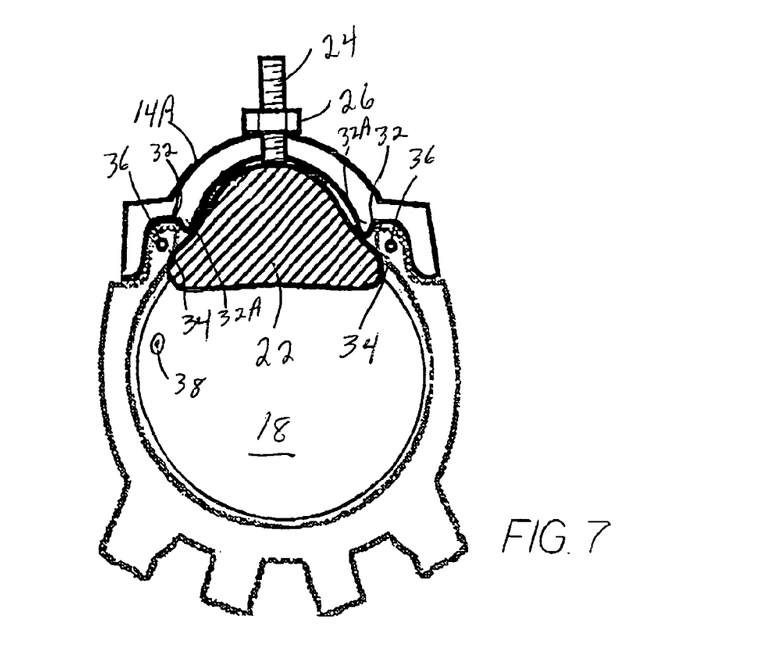
FIG. 7 is a view taken along the line 7—7 of FIG. 3.

FIG. 7 shows the view along the section 7—7 of FIG. 3, except that the internal shape of the rim 14A has been slightly modified to provide internal circumferential ridges 32A adjacent to the recesses 32. The internal ridges 32A have a diameter less than the minimum inside tire diameter of the tire casing 12. The rim lock 22 can be used with either configuration of the rim 14 or 14A. The rim lock 22 bolts through the rim 14 or 14A and presses portions of the tire edges 34 against the recesses 32. The rim lock 22 also wedges between two of the adjacent balls 18, tending to keep the balls 18 in their proper positions.

Figure 8:
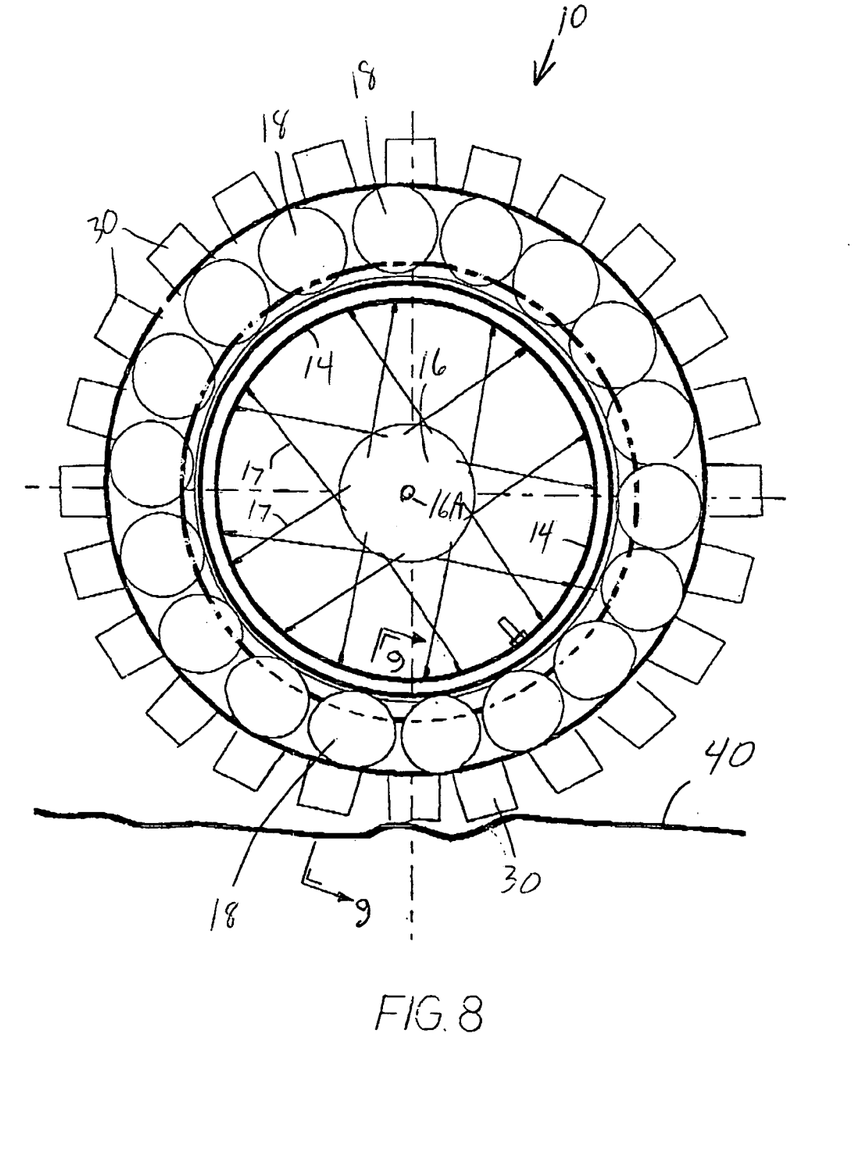
FIG. 8 shows the tire of FIG. 3 rolling along a support surface.

FIG. 8 is essentially the same schematic view as FIG. 3, but showing the tire assembly 10 rolling over a support surface 40. The weight of the motorcycle (or other vehicle)

and whatever the vehicle is carrying is supported on the axle 16A, which is supported by the hub 16, which, in turn, is mounted onto the rim 14 by means of the spokes 17. The spokes 17 are secured to the wheel rim 14 by conventional wheel spoke nipples. Various other known mechanisms for mounting the hub 16 to the rim 14 are known in the art and could be used in conjunction with the present invention.

Figure 9:
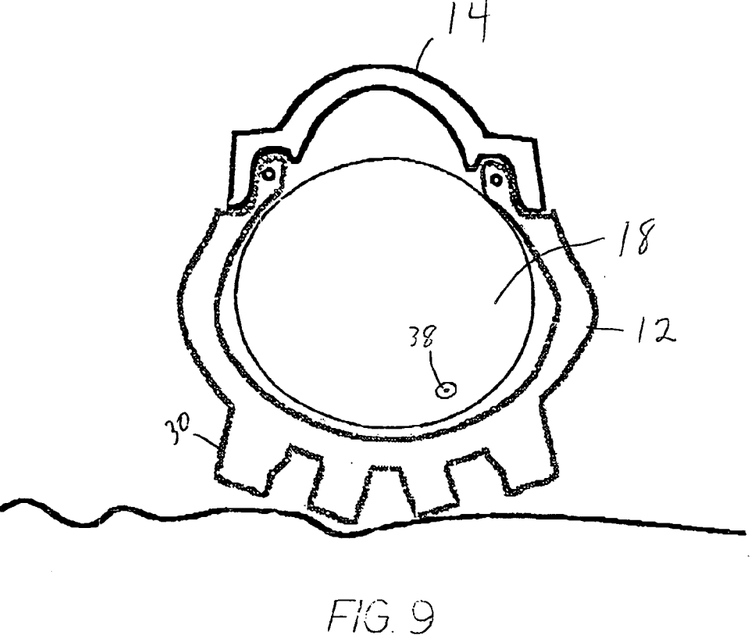
FIG. 9 is a view taken along the line 9—9 of FIG. 8.

FIG. 9 is a view taken along the section 9—9 of FIG. 8. This figure shows that the tire 12 of FIG. 8 deforms in the area that is in contact with the support surface 40, which causes the balls 18 in that area to deform slightly. As the ball 18 deforms, its volume is reduced, causing its internal pressure to increase. The pressure in the other balls remains the same. Obviously, as the wheel rotates, different balls will be in the lower position and will take on the deformed shape with a higher internal pressure, while the balls that were originally deformed will return to a more spherical shape as they rotate upwardly away from the terrain.

Figure 10:
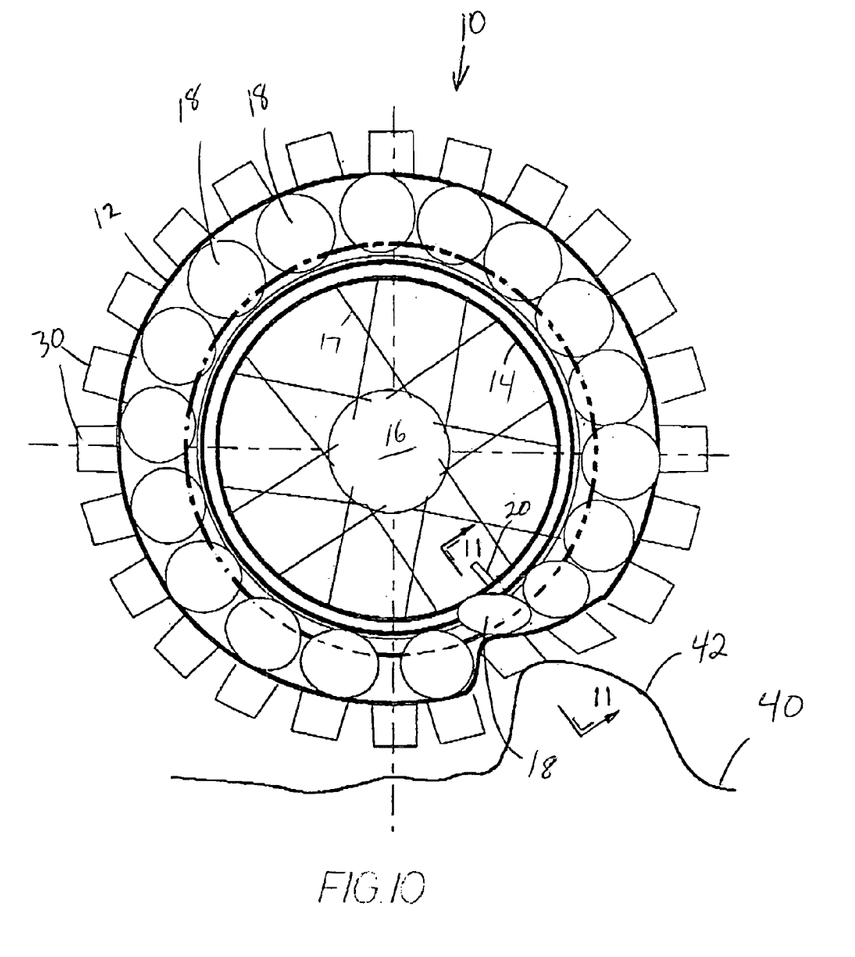
FIG. 10 is a view of the tire of FIG. 3 encountering a large bump in the support surface.
Figure 11:
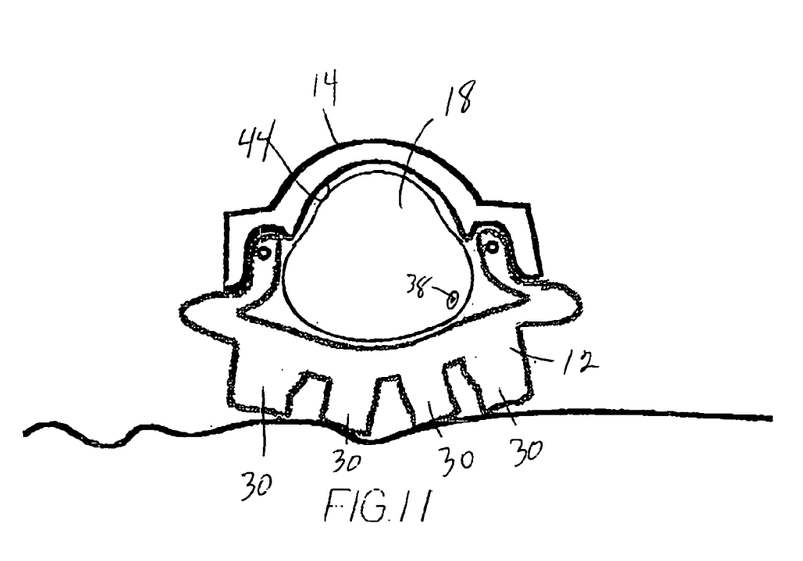
FIG. 11 is a view taken along the line 11—11 of FIG. 10.

FIG. 10 shows the tire 12 hitting a bump 42 on the support surface 40. This causes a greater deformation of the tire 12 in the area of the bump 42, which, in turn, causes greater deformation of the ball 18 in the area of the bump 42. This deformation of the tire 12 gives the tire good traction. FIG. 11 shows that the ball 18 in the area of the bump deforms so much that it enters an upper portion 44 of the cavity between the rim 14 and the tire 12 into which it usually does not enter. This substantial deformation of the ball 18 greatly reduces its volume, thereby greatly increasing its internal pressure. Because the internal pressure greatly increases, the ball 18 resists further deformation with a greater force, which prevents the tire 12 from being cut by the rim 14 and prevents the rim 14 from directly contacting the bump 42, thereby protecting both the rim 14 and the tire 12 from damage. It should also be noted that, as the tire 12 flattens out on the bottom, the spacing between the knobs 30 is reduced.

FIGS. 12–14 show one preferred method of making the balls 18. It is important that the balls 18 not stretch substantially, even under substantial pressure, and that the balls 18 be reliable enough to withstand large forces without exceeding their elastic limits. In initial prototypes, the inventor used a rotation molding process to form the balls by coating the inside of a rotating spherical mold with a polymeric material. However, the inventor has not yet been able to control the quality of a thin-walled ball sufficiently using that process in order to ensure that every ball can withstand the anticipated forces without failing. While it is anticipated that further testing and experimentation will produce a rotationally-molded ball that meets the desired specifications, for now the inventor is making the balls 18 by welding together uniform sheet portions having the desired properties. In this preferred embodiment, two sheet portions 50, 52 of the desired material are cut into a circular shape, as shown in FIG. 12. A valve 38 is installed on one of the portions 50. Then, the two portions 50, 52 are brought together and welded around their peripheries 54 to form a seam. The resulting flat assembly is then inflated by injecting gas under pressure through the valve 38, to form the inflated ball 18, shown in FIG. 14. In this preferred embodiment, the sheets 50, 52 are made of polyether based polyurethane having a thickness of 0.050 inches, and the two sheet portions 50, 52 are welded together using radio frequency welding. The ball 18 may have a fabric cover (not shown), or the fabric cover may be omitted. Also, the ball 18 could be made without a valve and could be inflated during the manufacturing process, but, in that case, the internal pressure of the ball 18 could not be adjusted.

Figure 1:
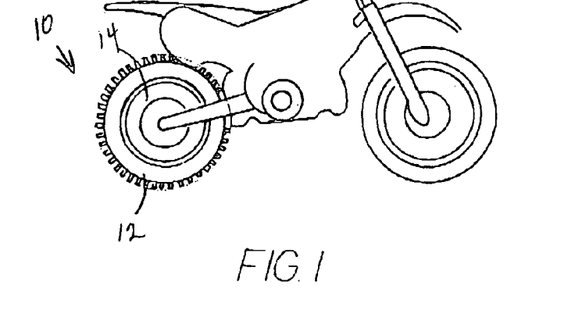
FIG. 1 is a side view of a motorcycle using tires made in accordance with the present invention.
Figure 2:
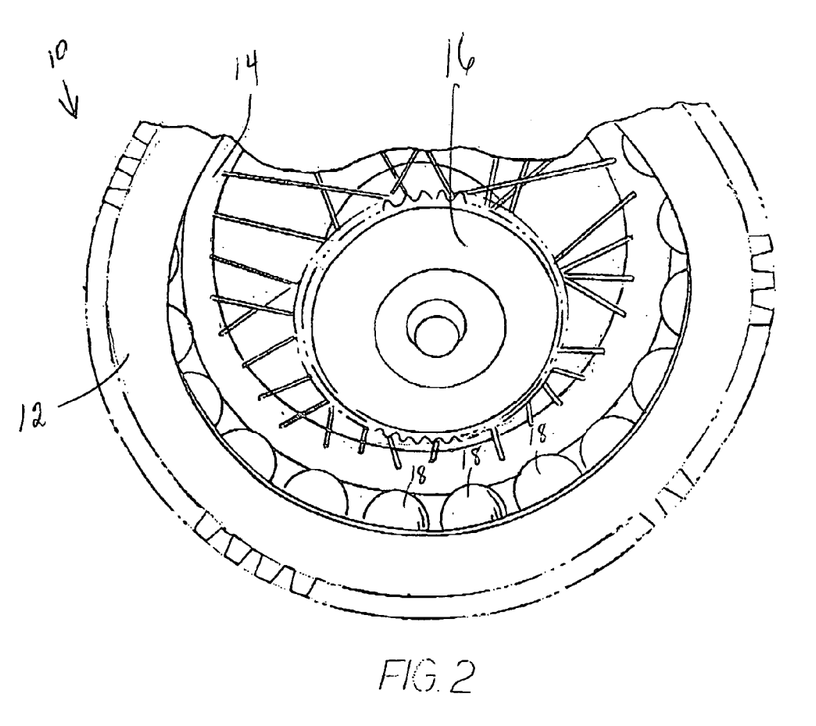
FIG. 2 shows a portion of the rear tire of FIG. 1 partially disassembled to reveal the internal balls.
Figure 15:
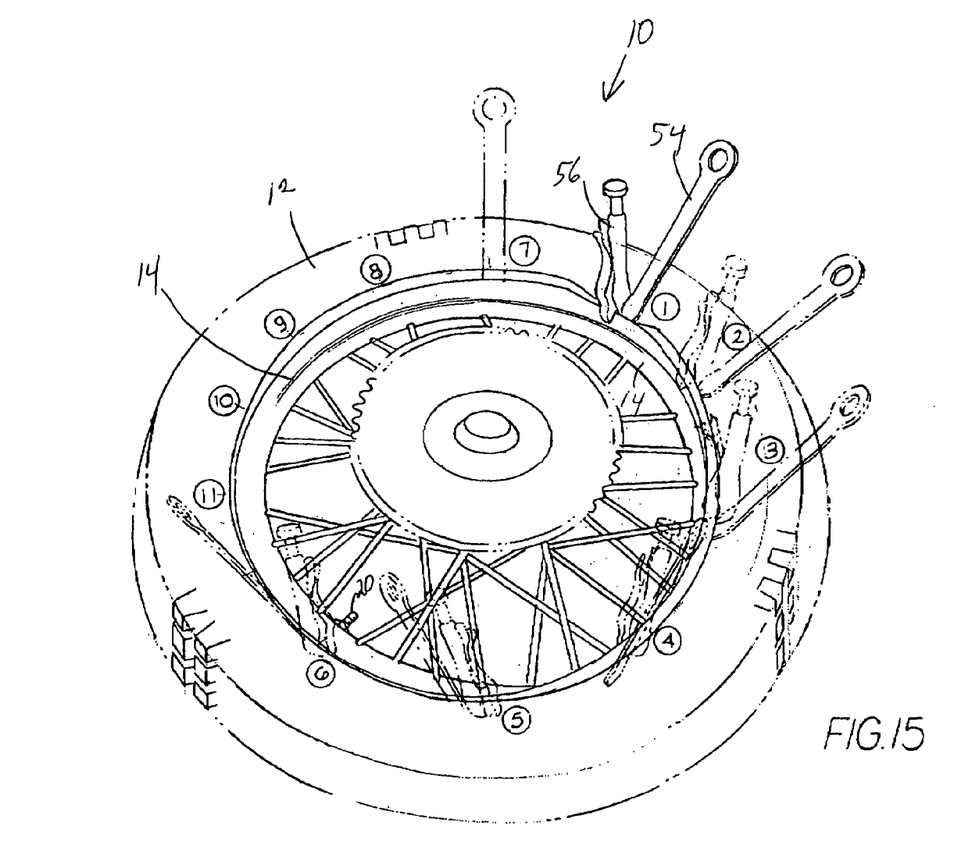
FIG. 15 shows the tire of FIG. 2 being installed onto its rim.

Assembling the tire 12 onto the rim 14 is shown in FIG. 15. First, one edge 32 of the deflated tire 12 is placed onto the rim 14 in the usual way. Then, the inflated balls 18 are put inside the tire 12, as shown in FIG. 2. Then the other edge 32 of the tire 12 is worked into position using a tire spoon 54 and a plurality of clamps 56. First, the tire spoon 54 is used to push a portion of the tire edge 32 into place on the rim 14 at the point labeled #1. Then, a clamp 56 is clamped onto the rim 14 at the position #1, and the clamp 56 prevents the portion of the edge 32 from jumping back off of the rim 14. Then, the tire spoon 54 is moved to position #2, where it pushes another portion of the edge 32 into place on the rim 14, and another clamp 56 is clamped onto the rim 14 at that position. The installer continues to work the tire spoon 54 around the rim 14 until the entire edge 32 has passed over the edge of the rim 14 and into its respective recess 32. Then, the installer adds some air under pressure to the inside of the tire 12 through the valve 20 to help seat the edges 34 of the tire 12 against the recesses 32 of the rim 14. Then, the valve 20 may be opened to release that pressure. (An alternate method of seating the tire casing is to drive the wheel at high speed, with the resulting centrifugal force being sufficient to properly seat the tire casing 12 to the rim 14A.)

Figure 5:
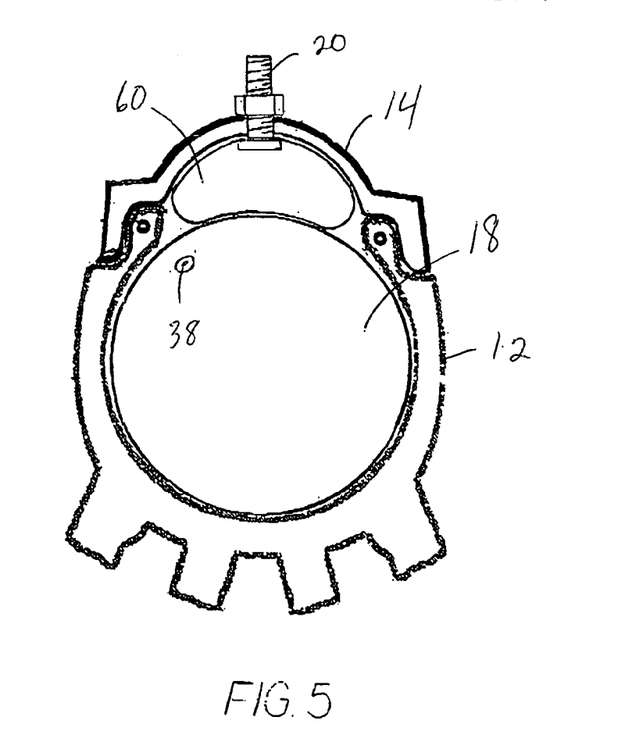
FIG. 5 is the same view as FIG. 4, but showing an alternative embodiment, in which an inner tube is inserted between the balls and the rim.

An alternative embodiment is shown in FIG. 5. In that embodiment, the assembly is the same as in the first embodiment, except that an inner tube 60 has been inserted between the balls 18 and the rim 14. The balls 18 still have a diameter and extend radially to span the space from the tire edges to the tread area of the tire, so that there is only a single layer of balls 18. In this embodiment, the valve 20 goes through the rim 14 and into the interior of the tube 60. The inner tube 60 is a standard inner tube, having a toroidal shape. This results in a hybrid-type of tire assembly. If the pressure inside the tube 60 is low, the assembly functions in the same manner as the first embodiment, as if the tube were not present. As the pressure of the tube 60 is increased, the tire assembly acquires a more rigid effect. The tube 60 allows external adjustment for changes in load, terrain, or altitude.

While the preferred embodiment of the invention, as shown in FIG. 3, has all the balls 18 inflated to approximately the same pressure, an alternative would be to inflate the balls 18 to different pressures, for example, alternating from a higher pressure in one ball to a lower pressure in the next adjacent ball, back to a higher pressure in the next ball, and so forth, in a repeating pattern. This would have a similar effect to providing knobs on the tire 12, in that the lower pressure balls would compress more under load than the higher pressure balls, causing the portions of the tire 12 supported by the higher pressure balls to dig into the support surface, giving the resulting assembly very good traction properties.

Figure 16:
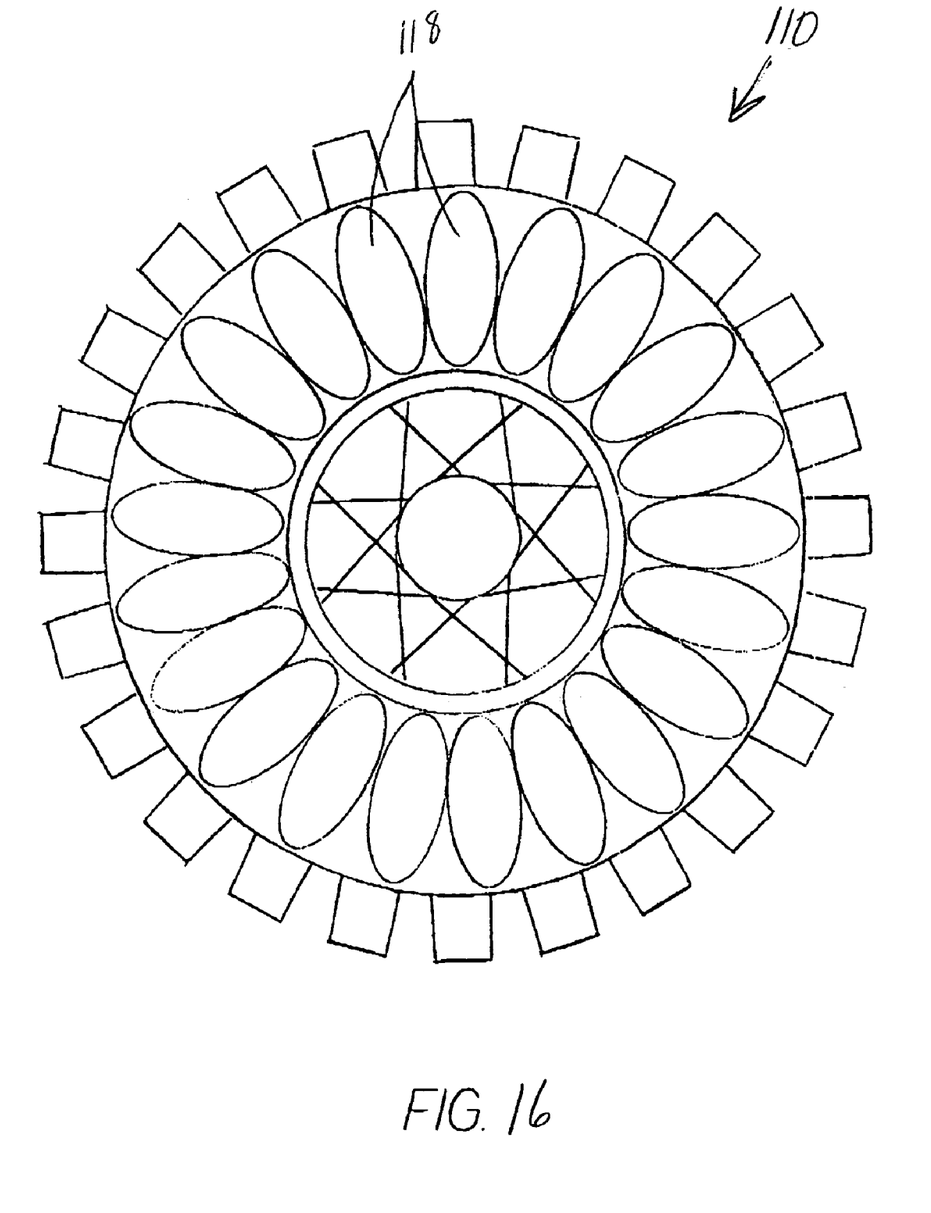
FIG. 16 shows an alternative embodiment of a tire with balls in which the balls have an oblong shape.
Figure 17:
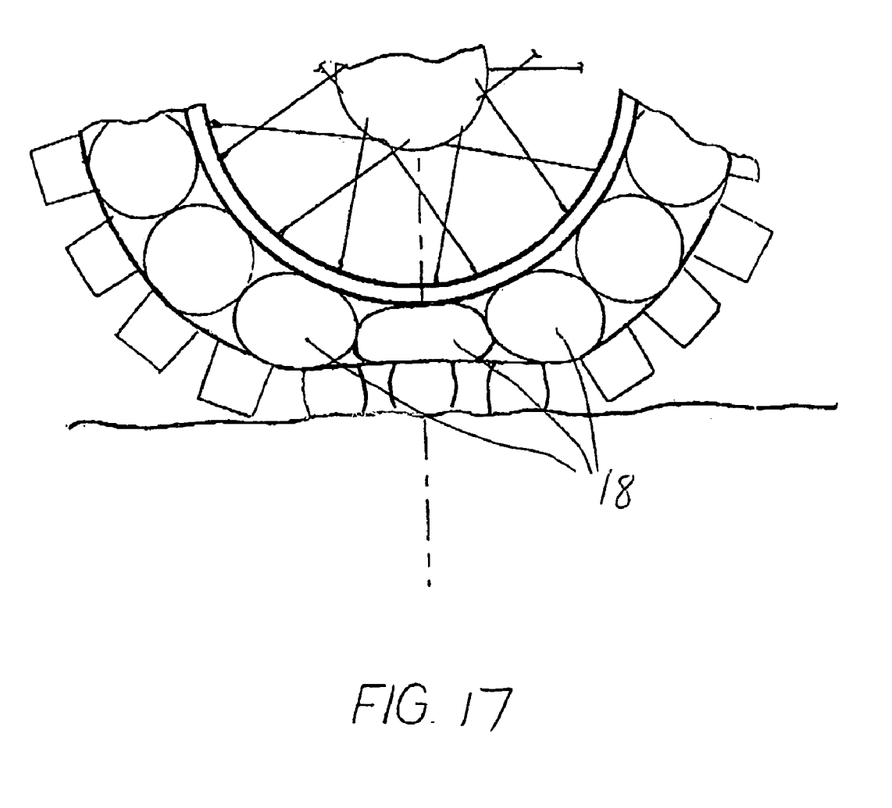
FIG. 17 shows the portion of the tire of FIG. 10 in contact with a road or other flat surface.

FIG. 16 shows an alternative embodiment of a tire assembly 110. In this assembly, the side walls of the tire are large. In this case, if the balls were spherical, very few balls would be needed to fill the space. It is preferable to have a relatively large number of balls inside the tire, on the order of 20 or more balls, in order to achieve the desired properties of being able to continue operation even when some of the balls are deflated and of providing a progressive suspension and protection of the tire and rim due to higher internal pressures in the individual balls. As shown in FIG. 17, it is desirable that at least three of the balls be supporting the load at any given time. Therefore, when the side walls of the tire are high relative to the width of the tire, as in FIG. 16, the balls 118 may have a more oblong or elliptical shape in order to provide a relatively large number of balls to fill the space.

For purposes of this specification, when a ball has a non-spherical shape, the term "diameter" shall mean the longest straight-line dimension through the ball, so that, in this case, the diameter would be the height of the ball.

Looking at FIG. 17, it can be seen that each of the individual balls 18 is independent of the tire and rim and is free to shift in the circumferential direction relative to the tire and rim, so that, if one ball is punctured and deflates, the remaining balls are free to shift circumferentially and redistribute themselves to substantially fill the space that was created by the deflated ball, with the result being that the vehicle continues to be well-supported, and the tire does not go flat. Even if a rim lock 22 is used, as shown in FIGS. 3 and 5, the individual balls 18 are still free to shift circumferentially relative to the hub and tire to redistribute themselves in order to provide continued support in the event that a ball 18 goes flat. While the foregoing embodiments have shown other elements located inside the hollow space, in addition to the balls 18, such as a rim lock 22 and air that is outside of the balls 18, the balls 18 are the most rigid elements that extend radially to the tread area. The rim lock 22, which is more rigid than the balls 18, is radially recessed, lying adjacent to the rim, so it does not extend radially the tread area and does not interfere with the quality of the ride provided by the balls 18. The air that is outside of the balls 18 and inside the hollow space does extend radially to the tread area, but it is less rigid than the balls 18.

While the tire assemblies shown herein support the hub on spokes and are intended to be used on a motorcycle, many other known types of hubs could be used, and the resulting tire assemblies could be used on a wide variety of vehicles, including automobiles, trucks, airplanes, and so forth.

The preferred embodiments described above are understood simply to be examples of what the inventor believes to be the best way of carrying out the invention. Applicant has not attempted to show herein every possible version of the invention that is intended to be protected by the claims, as this would be impossible, and it is not required in order to obtain a patent that protects the full scope of the invention. While some alternatives have been mentioned in this specification, it would be obvious to those skilled in the art to make many other modifications to these embodiments without departing from the scope of the invention. Therefore, these examples should not be considered to add any limitations that are not intended by the plain meaning of the words of the claims, unless the words in the claims have clearly been given a special definition herein.

What is claimed is:

1. A tire assembly, comprising:
a rim having a generally U-shaped cross-section, an inner surface and an outer surface, and defining left and right recesses on its inner surface;
a tire mounted on said rim, said tire including left and right edges received in said left and right recesses, wherein a hollow space is formed between said tire and said rim; and
a plurality of inflated balls located in said hollow space, wherein each ball has a diameter and spans the space between the tire and the rim, and wherein each ball can support a load in pounds that is at least as great as one hundred times the cube of its diameter in inches without exceeding its tensile limit and without exceeding its elastic limit, and wherein the wall thickness of said ball is less than three percent of its diameter.

2. A tire assembly, comprising:
a rim, including a one-piece ring having an inner surface and an outer surface, and defining left and right recesses on its inner surface;
an opening through said rim, and a valve in said opening for controlling the flow of gas through said rim;
a tire mounted on said rim and defining an open space between the tire and the rim, said tire including left and right edges received in said left and right recesses, said left and right edges including left and right embedded cords; and
a plurality of gas-filled balls located between said tire and said rim, each of said balls having a wall, and an individual valve which controls the flow of gas through the wall, wherein the pressure of gas on the interior of each ball is greater than the ambient gas pressure acting on the outside of the ball in order to maintain the ball in an inflated state, wherein said balls are independent of said rim and tire and are free to shift circumferentially relative to said rim and tire;
wherein each of said balls has a diameter and spans the space between the tire and the rim so that a single layer of balls fills that space;
and wherein the balls are inflated to substantially different internal pressures with lower pressure balls and higher pressure balls arranged at desired intervals in a repeating pattern and with the lower pressure balls deforming more under pressure than the higher pressure balls, so as to provide an effect similar to having knobs on the outer surface of the tire, wherein each ball can support a load in pounds that is at least as great as one hundred times the cube of its diameter in inches without exceeding its tensile limit and without exceeding its elastic limit, and wherein the wall thickness of said ball is less than three percent of its diameter.

3. A tire assembly, comprising:
a rim having a generally U-shaped cross-section, an inner surface and an outer surface, and defining left and right recesses on its inner surface:
a tire mounted on said rim, said tire including left and right edges received in said left and right recesses, wherein a hollow space is formed between said tire and said rim; and
a plurality of inflated balls located in said hollow space, wherein each ball has a diameter and spans the space between the tire and the rim; and
wherein each of said balls comprises:
a thin wall, defining an interior surface and an exterior surface;
wherein the thickness of said thin wall is less than two percent of the diameter, and wherein said ball can support a load in pounds that is at least one hundred times the cube of its diameter in inches without exceeding its tensile limit, without exceeding its elastic limit, and without expanding more than 50% from its initial surface area.

4. A tire assembly as recited in claim 3, wherein said ball includes a valve.

5. A tire assembly as recited in claim 4, wherein said ball is made of polyurethane.

6. A tire assembly as recited in claim 5, wherein said ball is made of welded-together sheets.

* * * * *